(12) United States Patent
Kim

(10) Patent No.: US 6,832,054 B2
(45) Date of Patent: Dec. 14, 2004

(54) HIGH SPEED OPTICAL RECEIVER IMPLEMENTED IN ONE CHIP

(75) Inventor: Yong-sub Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 579 days.

(21) Appl. No.: 09/949,701

(22) Filed: Sep. 10, 2001

(65) Prior Publication Data
US 2002/0089728 A1 Jul. 11, 2002

(30) Foreign Application Priority Data
Jan. 5, 2001 (KR) .............................................. 2001-672

(51) Int. Cl.[7] .............................................. H04B 10/06

(52) U.S. Cl. ..................... 398/202; 398/208; 250/214 A (58) Field of Search ................................ 398/202, 208; 250/214 A, 214 LA (56) References Cited

FOREIGN PATENT DOCUMENTS

KR  1996-0008579  6/1996  ........... H01L/33/00

*Primary Examiner*—Kinfe-Michael Negash
(74) *Attorney, Agent, or Firm*—F. Chau & Associates, LLC (57) ABSTRACT

An optical receiver receives a current signal from an optical receiving diode which receives an optical signal, and converts the optical signal into the current signal. The optical receiver includes a current/voltage converter, a DC remover, an amplifier and a level converter implemented in a single chip. The current/voltage converter converts the current signal into a voltage signal and outputs the differential voltage signal as a conversion voltage signal. The DC remover removes DC components from the conversion voltage signal. The amplifier amplifies the output signal of the DC remover and then outputs the amplified output signal of the DC remover. The level converter converts the level of the output signal of the amplifier into a CMOS level and then outputs the output signal of the amplifier as data. The current/voltage converter has a single input structure in which a current signal is input into one input terminal.

16 Claims, 5 Drawing Sheets

HIGH SPEED OPTICAL RECEIVER IMPLEMENTED IN ONE CHIP

BACKGROUND OF THE INVENTION

1. Field of the Invention

The present invention relates to an optical transmission system, and more particularly, to an optical receiver operating at high speed.

2. Description of the Related Art

Figure 1:
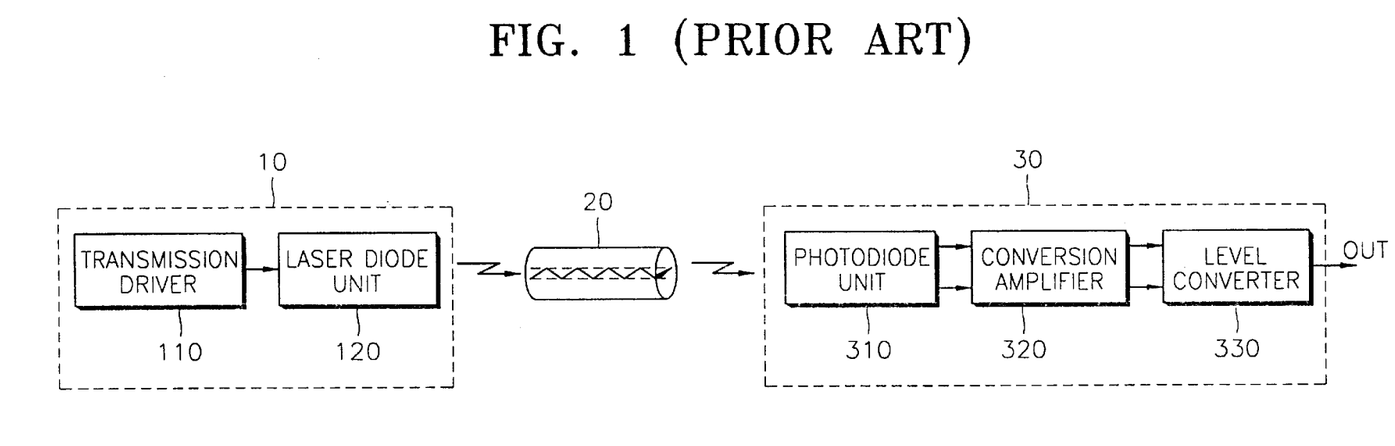
FIG. 1 is a schematic block diagram illustrating a conventional optical transmission system.

As shown in FIG. 1, a conventional optical transmission system includes a light transmission terminal 10, which converts an electric signal into an optical signal and transmits the optical signal via a light transmission medium 20, and a light receiving terminal 30, which converts the optical signal back into an electric signal. In general, the light transmission terminal 10 includes a laser diode unit 120, which converts an electric signal into an optical signal and outputs the optical signal, and a transmission driver 110, which controls the light output power of the laser diode unit 120. The light transmission medium 20 may be made of plastic optical fiber (POF) or glass optical fiber (GOF). The light receiving terminal 30 includes a photodiode unit 310, a conversion amplifier 320 and a level converter 330.

The photodiode unit 310 converts a received optical signal into a current signal. The conversion amplifier 320 removes DC components from the current signal and amplifies the voltage. In the conversion amplifier 320, an analog signal is processed. The level conversion unit 330 converts the level of the analog signal output from the conversion amplifier 320 into a digital signal, suitable for operating CMOS circuitry.

The conversion amplifier 320 is very sensitive to noise. A circuit (not shown) within the conversion amplifier 320, which processes a signal having a relatively low level before the signal is amplified, is also sensitive to noise. Thus, it can be difficult to implement the conversion amplifier 320 together with the level converter 330, which generates switching noise, in a single chip. Therefore, in the conventional light transmission system, the conversion amplifier 320 and the level converter 330 are realized in separate chips, and thus, the integration density of a device is lowered and use of the device may be inconvenient.

Also, in the conventional light transmission system, the conversion amplifier 320 of the light receiving terminal 30 is formed to have a particular structure into which two signals can be input. In other words, the conventional conversion amplifier 30 has a differential input-differential output structure which enables it to receive a differential input signal and generate a differential output signal. Thus, to realize the characteristics of a photodiode, a dummy capacitor (not shown) is further included at a differential input terminal of the conversion amplifier 320, thereby realizing an actual capacitance of the photodiode. However, the capacitance of the photodiode may vary depending on a process for manufacturing the photodiode and the amount of reverse bias voltage applied to the photodiode, and thus, an actual dummy capacitance becomes different from the capacitance of the photodiode. As a result, since the amount and phase of noise input into the conversion amplifier 320 changes in the case of installing the dummy capacitor instead of the photodiode, the probability that errors occur increases. In addition, the capacitance of the photodiode in the light transmission terminal 30 is high, and thus, the operational speed of a system is lowered.

Therefore, a need exists for an optical transmission system implementing a conversion amplifier and level converter in one chip.

SUMMARY OF THE INVENTION

To solve the above problems, it is a first object of the present invention to provide an optical receiver implemented in one chip, thereby enhancing the integration density and the convenience of use.

It is a second object of the present invention to provide an optical receiver that reduces the influence of noise and the probability of error occurrence and can be operated at high speed.

Accordingly, to achieve the first object, there is provided an optical receiver that receives an optical signal, converts the optical signal into a current signal and extracts data. The optical receiver includes a current/voltage converter that converts the current signal into a voltage signal and outputs the converted voltage signal as a conversion voltage signal; a DC remover that removes DC components from the converted voltage signal; an amplifier that amplifies the output signal of the DC remover and outputs the amplified signal; and a level converter that converts the level of the output signal of the amplifier into a CMOS level and then outputs the converted signal as the data. The current/voltage converter, the DC remover, the amplifier and the level converter are implemented in one chip.

Preferably, a predetermined power voltage is supplied to the current/voltage converter, the DC remover, the amplifier and the level converter through power lines isolated from each other, thereby minimizing the influence of noise caused by the power lines.

To achieve the second object of the present invention, there is provided an optical receiver that receives a current signal from an optical receiving diode, which converts an optical signal into the current signal, and extracts data. The optical receiver includes a current/voltage converter that converts the current signal into a differential voltage signal and outputs the converted voltage signal as a conversion voltage signal; a DC remover that removes DC components from the conversion voltage signal; an amplifier that amplifies the output signal of the DC remover and outputs the output signal of the DC remover; and a level converter that converts the level of the output signal of the amplifier into a CMOS level. The current/voltage converter has a single input structure in which the current signal is input to one input terminal.

Preferably, the current/voltage converter includes a first bipolar transistor having a common base structure in which the current signal is input into the emitter of the first bipolar transistor and output to the collector of the first bipolar transistor.

The optical receiver of the present invention is implemented in one chip, thereby enhancing the integration density of the optical receiver and the convenience of use. In addition, the optical receiver of the present invention is less sensitive to noise, and thus the probability of error occurrence can be reduced and the optical receiver can be operated at high speed.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF PREFERRED EMBODIMENTS

The present invention now will be described more fully with reference to the accompanying drawings, in which a preferred embodiment of the invention is shown. The same reference numerals in different drawings represent the same element.

Figure 2:
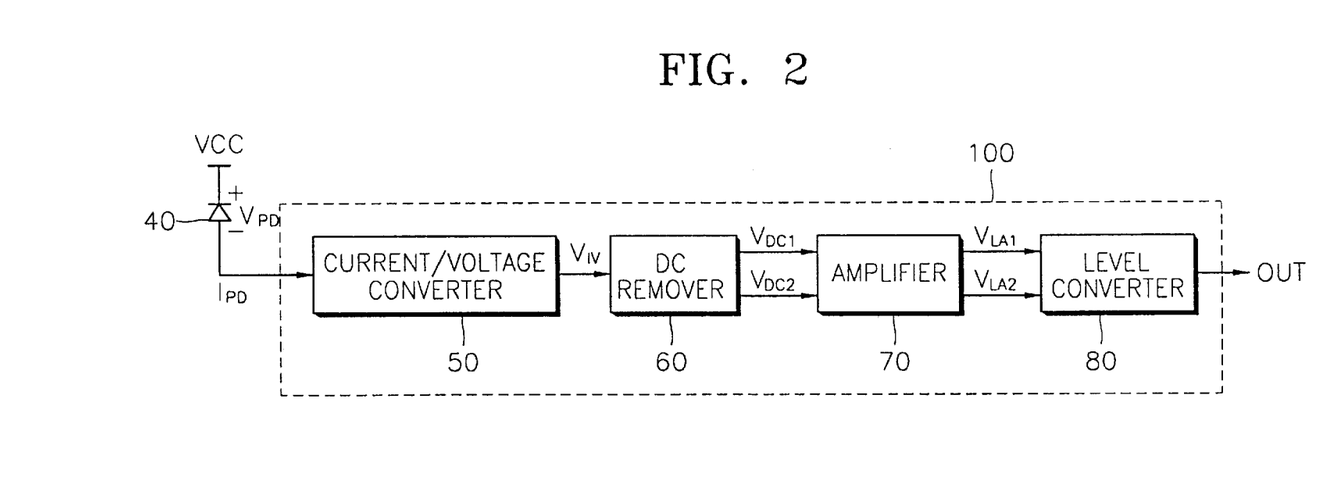
FIG. 2 is a schematic block diagram illustrating an optical receiver according to an embodiment of the present invention.

FIG. 2 is a schematic block diagram illustrating a light receiver 100 according to an embodiment of the present invention. Referring to FIG. 2, the light receiver 100 includes a current/voltage converter 50, a DC remover 60, an amplifier 70 and a level converter 80. A photodiode 40, which is a light diode for receiving an optical signal, is shown in this figure.

The photodiode 40 converts a received optical signal into an electric current signal $I_{PD}$ and outputs the electric current signal $I_{PD}$ The physical capacitance of the photodiode 40 varies depending on a reverse bias voltage $V_{PD}$, for example, if the reverse bias voltage $V_{PD}$ is high, capacitance decreases. Accordingly, if the reverse bias voltage $V_{PD}$ of the photodiode 40 is high, the capacitance of the photodiode 40 decreases, thereby enabling high-speed operation of a system.

The current/voltage converter 50 converts the current signal $I_{PD}$ input from the photodiode 40 into a voltage signal $V_{IV}$.

The DC remover 60 removes the bias current of the transmission driving current and other DC offsets from the light transmission terminal 10 of FIG. 1 and obtains a pure signal. The DC remover 60 receives the voltage signal $V_{IV}$ output from the current/voltage converter 50 and outputs differential voltage signals $V_{DC1}$ and $V_{DC2}$ in which DC components are removed. The characteristics of the transmission driving current used for transmitting an optical signal in the light transmission terminal 10 of FIG. 1 will be described with reference to FIG. 3.

Figure 3:
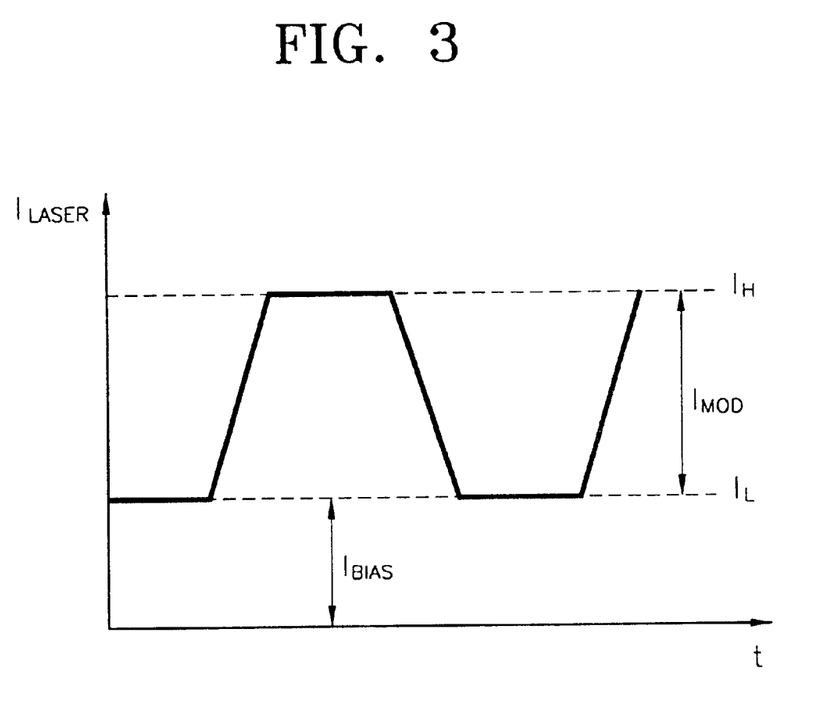
FIG. 3 is a diagram illustrating the waveform of a transmission driving current of the optical transmission system of FIG. 1.

FIG. 3 is a diagram illustrating the wave form of a transmission driving current. The transmission driver 110 of FIG. 1 adjusts the light output power of a laser diode by adjusting transmission driving current $I_{LASER}$ supplied to the laser diode unit 120 of FIG. 1. Here, the transmission driving current $I_{LASER}$ is supplied as a bias current $I_{BIAS}$ and a modulation current $I_{MOD}$. The bias current $I_{BIAS}$ is needed for preventing data transmission speed from lowering depending on whether a laser diode is turned on or turned off and switches the transmission driving current $I_{LASER}$ between the turn-on and turn-off currents of a laser diode.

The modulation current $I_{MOD}$ shows a high level or a low level of data actually transmitted and swings at a higher level compared to the bias current $I_{BIAS}$, so that the data transmission speed increases.

Referring to FIG. 2, the amplifier 70 amplifies the differential voltage signals $V_{DC1}$ and $V_{DC2}$ input from the DC remover 60 and supplies stable amplified signals $V_{LA1}$, and $V_{LA2}$ to the level converter 80. The level of the current signal $I_{PD}$ output from the photodiode 40 is very low, and, accordingly, the level of the voltage signal $V_{IV}$ which the current signal $I_{PD}$ is converted into is very low. An amplification unit 70 including of one or more amplifiers connected in series sets the voltage signal $V_{IV}$ at a desired level.

The level converter 80 converts the level of each of the amplified signals $V_{LA1}$, and $V_{LA2}$ input from the amplification unit 70 into a complementary MOS (CMOS) level and outputs the converted signals as data (OUT).

Figure 4:
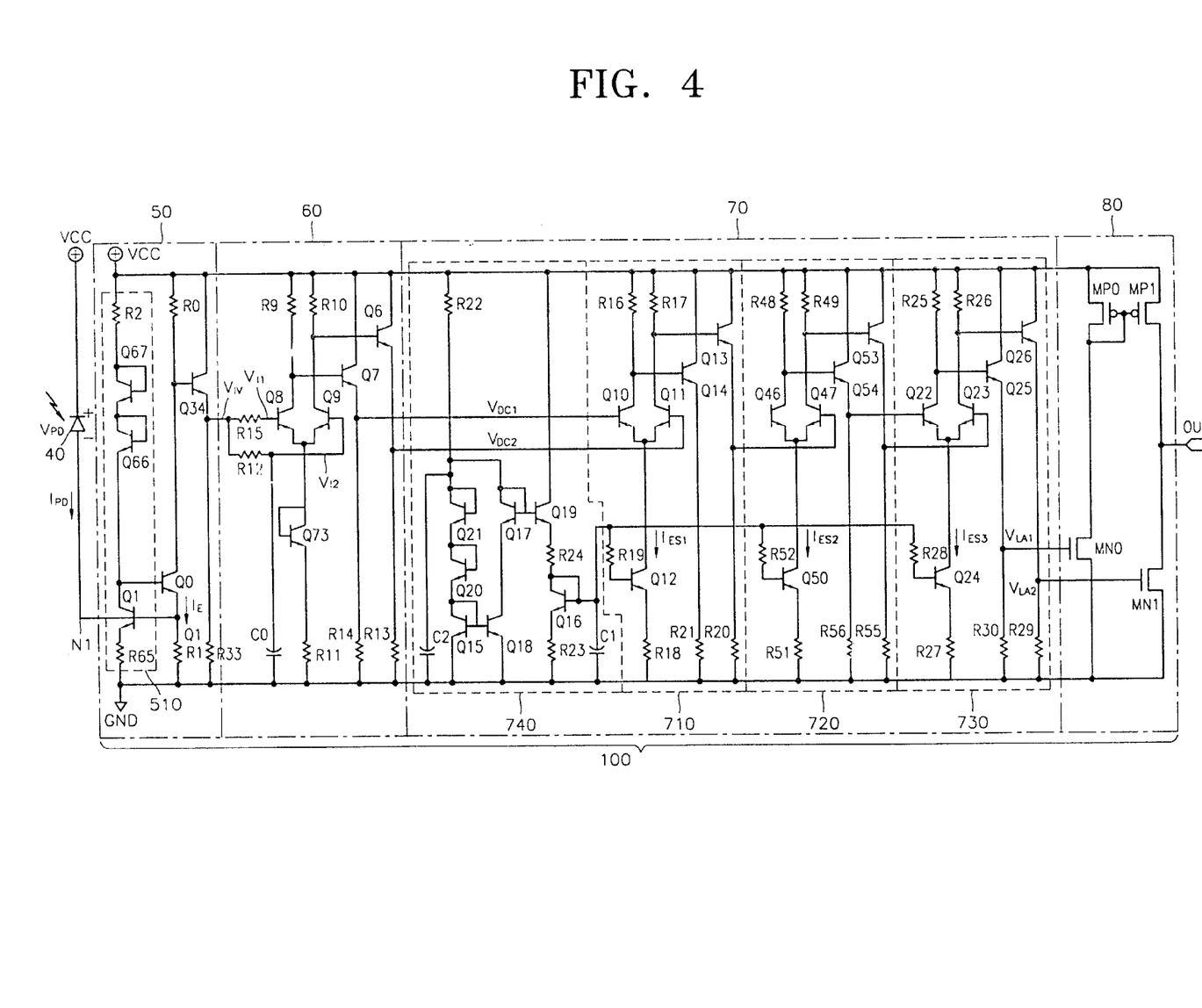
FIG. 4 is a circuit diagram illustrating the optical receiver illustrated in FIG. 2 according to an embodiment of the present invention.

FIG. 4 is a circuit diagram illustrating the optical receiver 100 of FIG. 2 according to an embodiment of the present invention and FIGS. 5A through 5F illustrate wave forms of some of the signals selected from the optical receiver 100 shown in FIG. 4.

Referring to FIG. 4, the current/voltage converter 50 converts the current signal $I_{PD}$ input from the photodiode 40 into the voltage signal $V_{IV}$. The current/voltage converter 50 includes transistors Q0, Q1, Q34, Q66 and Q67 and resistors R0, R1, R2, R33 and R65. The transistors Q0, Q1, Q34, Q66 and Q67 are NPN bipolar transistors.

The input transistor Q0 has a common base structure in which the current signal $I_{PD}$ is input into its emitter and voltage is output from its collector, which is connected to the output resistor R0. In the case of a current/voltage converter of a conventional optical receiver, an input transistor having a common emitter structure in which its base is connected to one side N1 of the photodiode 40 and voltage is output at its base, is used so that the voltage of the side N1 of the photodiode 40 is relatively high. Therefore, the reverse bias voltage $V_{PD}$ of the photodiode 40 becomes low.

On the other hand, in the optical receiver of the present invention, the emitter of the input transistor Q0 is connected to one side N1 of the photodiode 40 so that the side N1 of the photodiode 40 has a low voltage level. The other side of the photodiode 40 is connected to a power source voltage VCC so that the reverse bias voltage $V_{PD}$ is very high. The reverse bias voltage $V_{PD}$ applied to the photodiode 40 can be expressed by formula (1): where $V_{BE1}$ indicates the voltage between the base and emitter of the transistor Q1 and $I_{R65}$ indicates the current flowing through the resistor R65.

If the reverse bias voltage $V_{PD}$ of the photodiode 40 increases, capacitance decreases. As a result, the frequency characteristics of the current/voltage converter 50 are improved, so that the optical receiver can operate at a high speed.

The current/voltage converter 50 has a single input structure in which the current signal $I_{PD}$ is received via one input terminal. Unlike a current/voltage converter having a conventional differential input structure, the current/voltage converter 50 having the single input structure does not need a dummy capacitor for matching the characteristics of the photodiode 40. Therefore, occurrence of errors caused by mismatches between a dummy capacitance and an actual capacitance of the photodiode 40 may be prevented. In addition, the current/voltage converter 50 is less affected by noise.

Some of the transistors Q1, Q66 and Q67 and resistors R2 and R65 of the current/voltage converter 50 constitute a bias unit 510. The bias unit 510 biases the base voltage of the input transistor Q0 to a predetermined DC voltage. Accordingly, the emitter current $I_E$ is biased to be a predetermined DC current. The current signal $I_{PD}$ is applied to the emitter of the input transistor Q0. Thus, the biased DC current and a change in the current signal $I_{PD}$ applied from the photodiode 40 are reflected in the emitter current $I_E$.

Due to the emitter current $I_E$ of the input transistor Q0, the collector current of the input transistor Q0 varies and the voltage applied to the collector resistor of the input transistor Q0, that is, the collector voltage, also varies. The collector voltage of the input transistor Q0, whose DC voltage level is shifted by the output transistor Q34, is output as a conversion voltage signal $V_{IV}$. The collector voltage of the input transistor Q0 can be used as the conversion voltage signal $V_{IV}$. However, the collector voltage of the input transistor Q0 may have a high DC voltage level, and thus, it is preferable that the conversion voltage signal $V_{IV}$ is output from the emitter of the output transistor Q34.

The relation of the input current signal $I_{PD}$ to the output conversion voltage signal $V_{IV}$ can be expressed by formula (2):
where $Z_{IV}$ indicates trans-impedance gain, and $I_{PDH}$ and $I_{PDL}$ indicate the maximum and minimum values of $I_{PD}$, respectively. In addition, R0 indicates collector resistor R0 of the input transistor Q0.

Figure 5A:
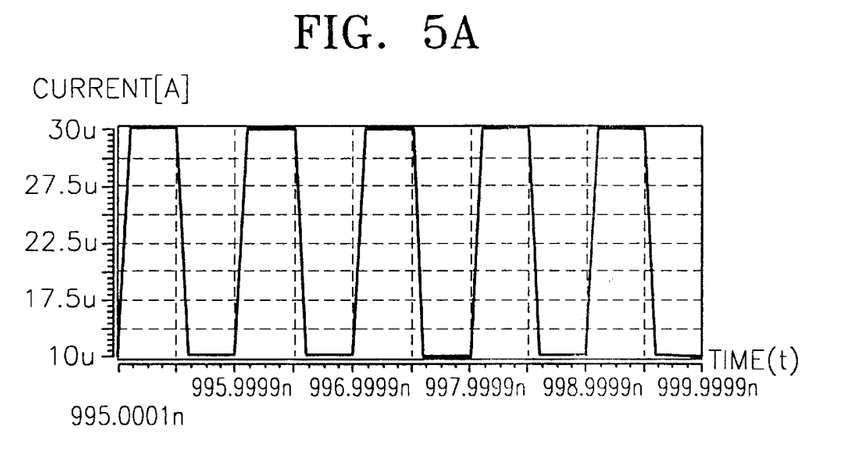
FIGS. 5A through 5F illustrate the waveforms of some of the signals selected from the optical receiver illustrated in FIG. 4.
Figure 5B:
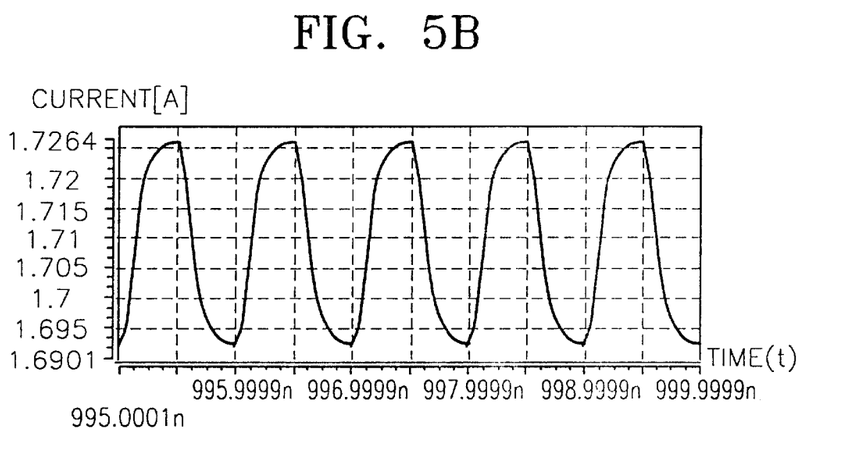

The current signal $I_{PD}$ output from the photodiode 40 and the conversion voltage signal $V_{IV}$, which is an output voltage of the current/voltage converter 50, are illustrated in FIGS. 5A and 5B, respectively. Referring to FIG. 5A, the current signal $I_{PD}$ has a peak-to-peak value of 20 $\mu$A and the frequency of the current signal $I_{PD}$ is 2 GHz. Referring to FIG. 5B, the conversion voltage signal $V_{IV}$ is a mono voltage signal and has fewer high-frequency components than the current signal $I_{PD}$.

The DC remover 60 is embodied in a differential amplifier. The DC remover 60 removes DC components from the conversion voltage signal $V_{IV}$ input therein, and outputs the resultant signal. The DC remover includes transistors Q8, Q9, Q73, Q6 and Q7, resistors R9 through R15 and a capacitor C0.

The conversion voltage signal $V_{IV}$ output from the current/voltage converter 50 is input to the bases of each of the differential transistors Q8 and Q9. Specifically, the conversion voltage signal $V_{IV}$ is input into the base of the first differential transistor Q8 via the resistor R15 and is input into the base of the second differential transistor Q9 via a low-pass filter. Here, the low-pass filter includes the resistor R12 and the capacitor C0. In other words, the resistor R12 and the capacitor C0 act as the low-pass filter and the average value of the conversion voltage signal $V_{IV}$ is input into the base of the second differential transistor Q9. Thus, a voltage signal having no DC component is output from the DC remover 60. The voltage signal applied to the output resistors R9 and R10 of the DC remover 60 is output as differential voltage signals $V_{DC1}$ and $V_{DC2}$ via the output transistors Q7 and Q6, respectively.

The DC remover 60 has a low cutoff frequency and the frequency can be expressed by formula (3):
where $F_{LC}$ indicates the low cutoff frequency of the DC remover 60.

Figure 5C:
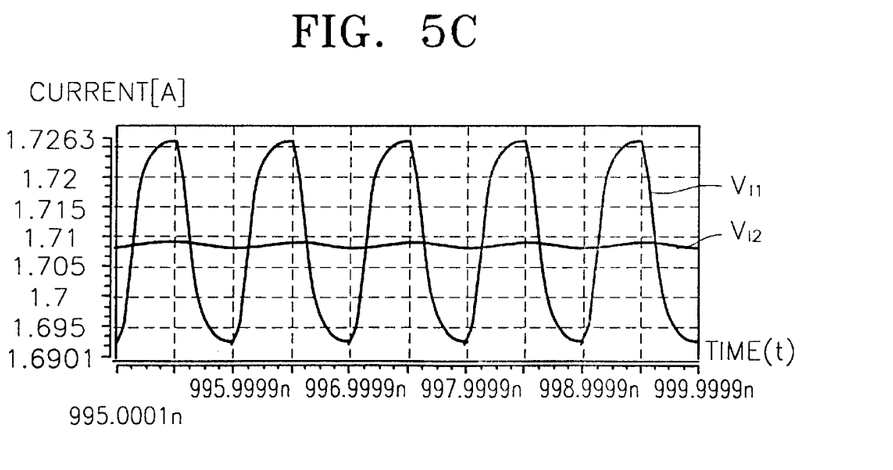

FIG. 5C shows signals input into the differential transistors Q8 and Q9 of the DC remover 60. In FIG. 5C, the graphs $V_{11}$ and $V_{12}$ indicate a signal input into the base of the first differential transistor Q8 and a signal input into the base of the second differential transistor Q9, respectively. $V_{11}$ is almost the same as the conversion voltage signal $V_{IV}$ and $V_{12}$ is the average value of the conversion voltage signal $V_{IV}$ and has an almost constant level.

Figure 5D:
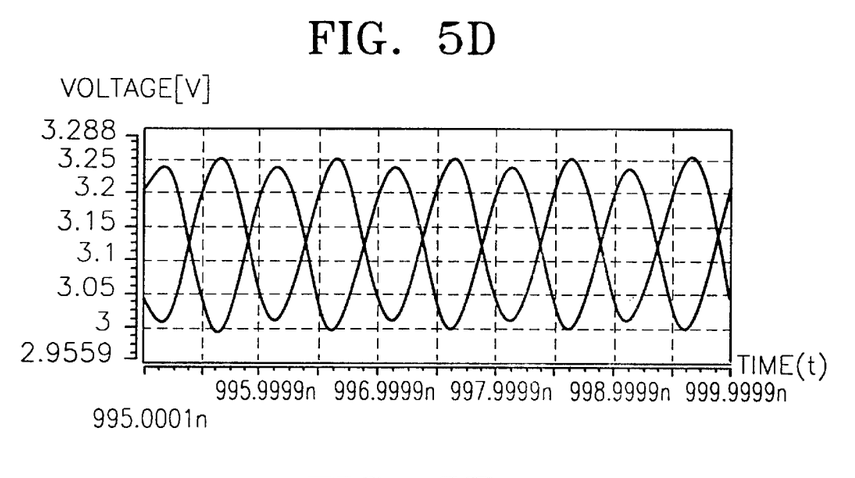

FIG. 5D shows the output signals $V_{DC1}$ and $V_{DC2}$ of the DC remover 60. The differential output signals $V_{DC1}$ and $V_{DC2}$ have different phases, however, they are of the same type.

The amplifier 70 includes three amplification terminals 710, 720 and 730 and each amplification terminal 710, 720 and 730 is formed of a differential amplifier having a common emitter structure. The first amplification terminal 710 includes transistors Q10 through Q14 and resistors R16 through R19. The output signals $V_{DC1}$ and $V_{DC2}$ are input into the bases of the differential transistors Q10 and Q11. The level of voltages applied to the collector resistors R16 and R17 of the two differential transistors Q10 and Q11 are shifted to DC levels through the output transistors Q14 and Q13, respectively, and then the voltages become the output voltage of the first amplification terminal 710. The differential output voltage of the first amplification terminal 710 is input into the bases of the differential transistors Q46 and Q47.

The differential transistors Q10 and Q11 of the first amplification terminal 710 have a common emitter structure. In other words, their emitters are connected with each other. The transistor Q12 and the resistors R18 and R19 act as a source of current $I_{ES1}$ flowing at the common emitter of the differential transistors R18 and R19. The common emitter current $I_{ES1}$ is controlled by an amplification bias unit 740. The amplification bias unit 740 includes bipolar transistors Q15 through Q21, resistors R22 through R24 and capacitors C1 and C2.

The structure and components of the second and third amplification terminals 720 and 730 are the same as the first amplification terminal 710 and their description will not be repeated. Common emitter currents $I_{ES2}$ and $I_{ES3}$ of the second and third amplification terminals 720 and 730 are also controlled by the amplification bias unit 740. However, the values of the common emitter currents $I_{E31}$, $I_{E32}$ and $I_{E33}$ can be varied depending on the values of the resistors R18 and R19, R51 and R52, and R27 and R28 which supplement the current source function of the first, second and third amplification terminals 710, 720 and 730, respectively.

As described above, the current signal $I_{PD}$ output from the photodiode 40 has a peak-to-peak value of several $\mu$A. Therefore, to detect such a minute signal, the gain of the amplifier 70 should be sufficiently large.

The gain of the amplifier 70 can be expressed by formula (4):
where GA indicates the gain of the amplifier 70 and A1, A2 and A3 indicate the gains of the first, second and third amplification terminals 710, 720 and 730, respectively. In addition, ro11, ro47 and ro23 indicate the early resistances of the differential transistors Q11, Q47 and Q23, respectively and re11, re47 and re23 indicate the emitter internal resistances of the differential transistors Q11, Q47 and Q23, respectively.

Figure 5E:
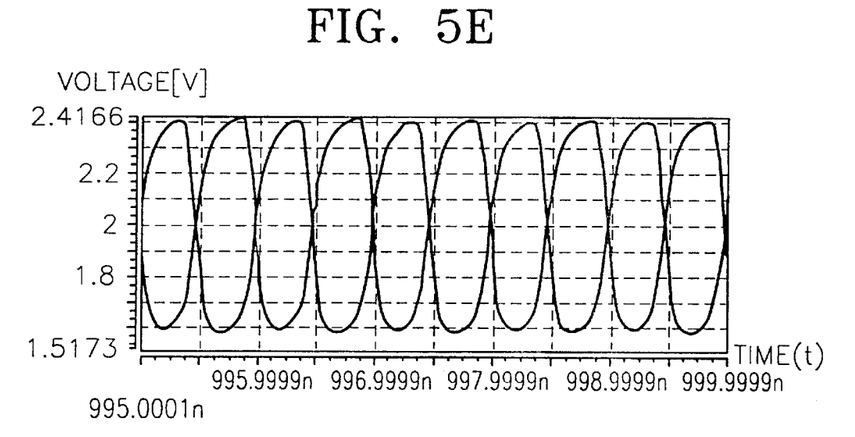

For compensating for the characteristics of frequency, the amplifier 70 shapes the waveform of a signal and provides a stable signal to the next terminal. FIG. 5E has output signals $V_{LA1}$ and $V_{LA2}$ of the amplifier 70. Referring to FIG. 5E, each waveform of the amplified signals $V_{LA1}$ and $V_{LA2}$ shows a relatively steep slope compared to the waveforms of the output signals $V_{DC1}$ and $V_{DC2}$ of the DC remover, which are not yet amplified. In other words, the frequency characteristics are compensated for by the amplifier 70.

The level converter 80 is a circuit for converting the levels of the output signals $V_{LA1}$ and $V_{LA2}$ of the amplifier 70 into CMOS levels, which are digital signal levels, and is formed to have a push-pull structure. The output signals $V_{LA1}$ and $V_{LA2}$ of the amplifier 70 are emitter-coupled logic signals and analog signals.

Specifically, the level converter 80 includes NMOS transistors MN0 and MN1 and PMOS transistors MP0 and MP1. The output signals $V_{LA1}$ and $V_{LA2}$ of the amplifier 70 are input into the gates of the NMOS transistors MN0 and MN1, respectively. If the voltage input into the gate of the first NMOS transistor MN0 is high and the voltage input into the gate of the second NMOS transistor MN1 is low, the first transistor MN0 is turned on and the voltage of the gates of the PMOS transistors MP0 and MP1 becomes low. Then, the PMOS transistors MP0 and MP1 are turned on. Here, the second NMOS transistor MN1 is turned off and thus, output data OUT becomes high, at about the level of the power supply voltage (VCC). On the other hand, if the voltage input into the gate of the first NMOS transistor MN0 is low and the voltage input into the gate of the second NMOS transistor MN1 is high, the voltage of each of the gates of the PMOS transistors MP0 and MP1 becomes high and then the PMOS transistors MP0 and MP1 are turned off. Here, the second NMOS transistor MN1 is turned on and thus, the output data OUT becomes low, at about the level of a ground voltage GND.

Figure 5F:
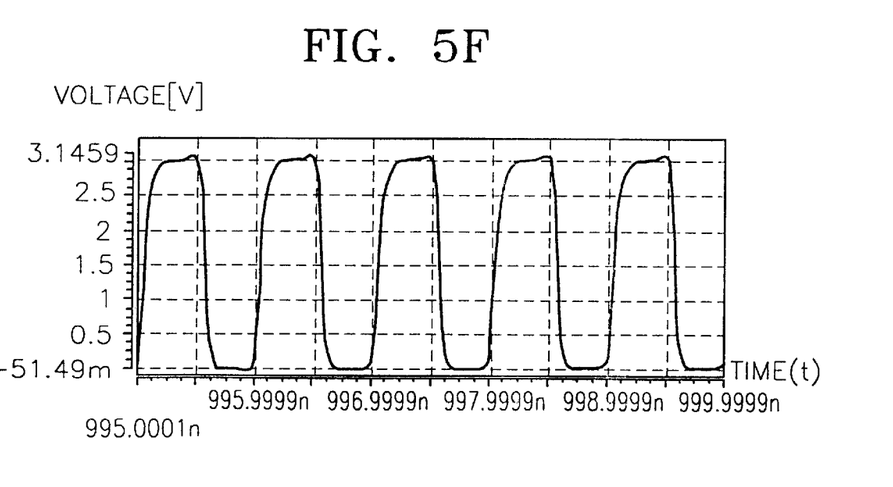

FIG. 5F shows the output data OUT of the level converter 80. Referring to FIG. 5F, the output data of the level converter 80 has a short period of transition between a high level and a low level. In addition, in this graph, the curve denoting changes in the voltage level of the output data OUT of the level converter 80 with respect to the passage of time includes substantially flat portions at certain voltage levels.

The optical receiver 100 according to the embodiment of the present invention is implemented in one chip. As described above, the optical receiver 100 includes the current/voltage converter 50 having a single input structure. Therefore, the optical receiver 100 is less influenced by noise. In FIG. 4, power lines for the power supply voltage VCC applied to the current/voltage converter 50, the DC remover 60, the amplifier 70 and the level converter 80 are illustrated as being connected with each other for the convenience of illustration. However, it is preferable that the power lines for the power supply voltage VCC applied to the current/voltage converter 50, the DC remover 60, the amplifier 70 and the level converter 80 are isolated from each other in the case of implementing the optical receiver in one chip. As a result, noise caused by the power lines can be minimized. In the prior art, the current/voltage converter 50 and the DC remover 60 are very sensitive to noise so that they cannot be formed together with the level converter 80 in which switching noise easily occurs in one chip. However, as described above, in the present invention, the optical receiver 100 can be implemented in one chip, thereby minimizing noise caused by the power lines and making the current/voltage converter 50 less sensitive to noise.

While this invention has been particularly shown and described with reference to preferred embodiments thereof, it will be understood by those skilled in the art that various changes in form and details may be made therein without departing from the spirit and scope of the invention as defined by the appended claims.

The optical receiver of the present invention is implemented in one chip, by which the integration density and the convenience of use are enhanced. Also, the optical receiver of the present invention is less sensitive to noise, so that the probability that errors occur can be reduced and the optical receiver can be operated at high speed.

Having described embodiments for an optical receiver, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. An optical receiver which receives an optical signal, converts the optical signal into a current signal and digitizes the current signal, comprising:
   a current/voltage converter which converts the current signal into a differential voltage signal and outputs the converted voltage signal as a conversion voltage signal;
   a DC remover which removes DC components from the converted voltage signal;
   an amplifier which amplifies the output signal of the DC remover and outputs the amplified signal; and
   a level converter which converts the level of the output signal of the amplifier into a CMOS level and then outputs the output signal of the amplifier as the data,
   wherein the current/voltage converter, the DC remover, the amplifier and the level converter are implemented in one chip.

2. The optical receiver of claim 1, wherein a predetermined power voltage is supplied to the current/voltage converter, the DC remover, the amplifier and the level converter through power lines isolated from each other.

3. The optical receiver of claim 1, wherein the current/voltage converter comprises a first bipolar transistor having a common base structure in which the current signal is input into an emitter of the first bipolar transistor and output to a collector of the first bipolar transistor.

4. The optical receiver of claim 3, wherein the current/voltage converter further comprises a bias unit for biasing DC current flowing at the emitter of the first bipolar transistor to a predetermined value.

5. The optical receiver of claim 3, wherein the current/voltage converter further comprises a second bipolar transistor for shifting a DC level of a collector voltage signal of the first bipolar transistor, the base of which is connected to the collector of the first bipolar transistor and the emitter of which outputs a conversion voltage signal.

6. The optical receiver of claim 1, wherein the DC remover comprises a differential amplifier having a common emitter structure, which has a first terminal into which a conversion voltage signal is input via a predetermined resistor and a second terminal into which a low-pass filtered signal of the conversion voltage signal is input, and outputs a differential voltage signal.

7. The optical receiver of claim 1, wherein the amplifier comprises at least one differential amplifier having a common emitter structure, which receives a differential input signal, amplifies the differential input signal with a predetermined amplification gain and outputs a differential output signal.

8. An optical receiver which receives a current signal from an optical receiving diode, which converts an optical signal into the current signal, and digitizes the current signal, the optical receiver comprising:
   a current/voltage converter for converting the current signal into a differential voltage signal and outputting a converted voltage signal as a conversion voltage signal;
   a DC remover for removing DC components from the conversion voltage signal;
   an amplifier for amplifying an output signal of the DC remover and outputting an amplified signal; and
   a level converter for converting a level of the output signal of the amplifier into a CMOS level, wherein the current/voltage converter has a single input structure in which the current signal is input to one input terminal.

9. The optical receiver of claim 8, wherein the current/voltage converter comprises a first bipolar transistor having a common base structure in which the current signal is input into an emitter of the first bipolar transistor and output to a collector of the first bipolar transistor.

10. The optical receiver of claim 9, wherein the current/voltage converter further comprises a bias unit for biasing DC current flowing at the emitter of the first bipolar transistor to a predetermined value.

11. The optical receiver of claim 9, wherein the current/voltage converter further comprises a second bipolar transistor for shifting a DC level of a collector voltage signal of the first bipolar transistor, the base of which is connected to the collector of the first bipolar transistor and the emitter of which outputs the conversion voltage signal.

12. The optical receiver of claim 8, wherein the DC remover comprises a differential amplifier having a common emitter structure, which has a first terminal into which the conversion voltage signal is input via a predetermined resistor and a second terminal into which a low-pass filtered signal of the conversion voltage signal is input, and outputs a differential voltage signal.

13. The optical receiver of claim 8, wherein the amplifier comprises at least one differential amplifier having a common emitter structure, which receives a differential input signal, amplifies the differential input signal with a predetermined amplification gain and outputs a differential output signal.

14. The optical receiver of claim 8, wherein the current/voltage converter, the DC remover, the amplifier and the level converter are implemented in one chip.

15. An optical receiver which receives a current signal from an optical receiving diode, which converts an optical signal into the current signal, and digitizes the current signal, the optical receiver comprising:

a current/voltage converter;

a DC remover connected to the current/voltage converter;

an amplifier connected to the DC remover; and a level converter connected to the amplifier, wherein the current/voltage converter has a single input structure in which a current signal is input to one input terminal.

16. The optical receiver of claim 15, wherein the current/voltage converter, the DC remover, the amplifier and the level converter are implemented in one chip.

* * * * *